United States Patent
Konishi et al.

(10) Patent No.: US 12,194,998 B2
(45) Date of Patent: Jan. 14, 2025

(54) VEHICLE CONTROL APPARATUS

(71) Applicant: Honda Motor Co., Ltd., Tokyo (JP)

(72) Inventors: Tatsuya Konishi, Wako (JP); Yuya Kaneda, Wako (JP); Kenta Ishii, Wako (JP); Tomoyuki Yokoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 17/959,213

(22) Filed: Oct. 3, 2022

(65) Prior Publication Data

US 2023/0111488 A1 Apr. 13, 2023

(30) Foreign Application Priority Data

Oct. 11, 2021 (JP) .................. 2021-166639

(51) Int. Cl.

| | |
|---|---|
| *B60W 30/16* | (2020.01) |
| *B60T 7/12* | (2006.01) |
| *B60T 8/24* | (2006.01) |
| *B60W 40/04* | (2006.01) |
| *G06T 7/70* | (2017.01) |
| *G06V 20/56* | (2022.01) |
| *G06V 20/58* | (2022.01) |

(52) U.S. Cl.
CPC .............. *B60W 30/16* (2013.01); *B60T 7/12* (2013.01); *B60T 8/24* (2013.01); *B60W 40/04* (2013.01); *G06T 7/70* (2017.01); *G06V 20/58* (2022.01); *G06V 20/588* (2022.01); *B60W 2420/403* (2013.01); *B60W 2710/18* (2013.01); *B60W 2720/106* (2013.01); *B60W 2754/30* (2020.02); *G06T 2207/30261* (2013.01)

(58) Field of Classification Search
CPC .......... B60T 7/12; G06V 20/58; B60W 30/16
USPC .............................................. 701/96
See application file for complete search history.

(56) References Cited

U.S. PATENT DOCUMENTS

2016/0121889 A1* 5/2016 Shimomura ......... G06V 20/588
701/41

FOREIGN PATENT DOCUMENTS

JP 2005329779 A * 12/2005

* cited by examiner

*Primary Examiner* — Todd Melton
*Assistant Examiner* — Vincent Feng
(74) *Attorney, Agent, or Firm* — Duft & Bornsen, PC

(57) ABSTRACT

A vehicle control apparatus including a camera, a detector acquiring position information of a target based on reflected wave and a microprocessor. The microprocessor is configured to perform estimating a position of the target, based on position information acquired by the camera and the detector, controlling an actuator based on the estimated position, and detecting a predetermined gradient state in which a gradient of a road surface in front of a subject vehicle is an upward gradient of a predetermined degree or more with respect to a road surface at a current position of the subject vehicle and is configured to perform the estimating including estimating the position of the target by lowering a reliability of position information acquired by the camera among position information of the target captured on the road surface in the predetermined gradient state when the predetermined gradient state is detected.

19 Claims, 3 Drawing Sheets

VEHICLE CONTROL APPARATUS

CROSS-REFERENCE TO RELATED APPLICATION

This application is based upon and claims the benefit of priority from Japanese Patent Application No. 2021-166639 filed on Oct. 11, 2021, the content of which is incorporated herein by reference.

BACKGROUND OF THE INVENTION

Field of the Invention

This invention relates to a vehicle control apparatus configured to control a vehicle based on signal from a sensor detecting an external environment.

Description of the Related Art

As this type of apparatus, conventionally, there is a known apparatus which is configured to recognize a forward vehicle traveling in front of the subject vehicle by a sensor fusion using a radar and a camera and to control an automatic braking system in accordance with the result of the recognition. Such a device is disclosed, for example, in Japanese Unexamined Patent Publication No. 2005-329779 (JP2005-329779A).

However, when the road surface in front of the subject vehicle is inclined at an upward slope compared to the road surface on which the subject vehicle is present, there is a possibility that a target such as the forward vehicle is not accurately recognized by the sensor fusion.

SUMMARY OF THE INVENTION

An aspect of the present invention is a vehicle control apparatus including a camera that captures an image of an external environment around a subject vehicle to acquire a first position information of a target, a detector that acquires a second position information of the target based on a reflected wave from a detection object in an imaging area of the camera, and an electronic control unit including a microprocessor and a memory connected to the microprocessor. The microprocessor is configured to perform estimating a position of the target, based on the first position information acquired by the camera and the second position information acquired by the detector, controlling an actuator for traveling mounted on the subject vehicle, based on the position of the target estimated, and detecting a predetermined gradient state in which a gradient of a road surface in front of the subject vehicle is an upward gradient of a predetermined degree or more with respect to a road surface at a current position of the subject vehicle. The microprocessor is configured to perform the estimating including estimating the position of the target by lowering a reliability of the first position information along a traveling direction of the subject vehicle acquired by the camera among a position information including the first position information and the second position information of the target captured on the road surface in the predetermined gradient state when the predetermined gradient state is detected.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 4. A vehicle control apparatus according to an embodiment of the invention can be applied to both a vehicle having a self-driving capability, i.e., a self-driving vehicle, and a vehicle not having the self-driving capability, i.e., a manual driving vehicle. Hereinafter, an example in which the vehicle control apparatus is applied to the self-driving vehicle will be described. The vehicle to which the vehicle control apparatus according to the present embodiment is applied may be sometimes called "subject vehicle" to differentiate it from other vehicles.

The subject vehicle is an engine vehicle having an internal combustion engine (engine) as a travel drive source, electric vehicle having a travel motor as the travel drive source, or hybrid vehicle having both of the engine and the travel motor as the travel drive source. The subject vehicle (self-driving vehicle) can travel not only in a self-drive mode in which a driving operation by a driver is unnecessary, but also in a manual drive mode in which the driving operation by the driver is necessary.

Figure 1:
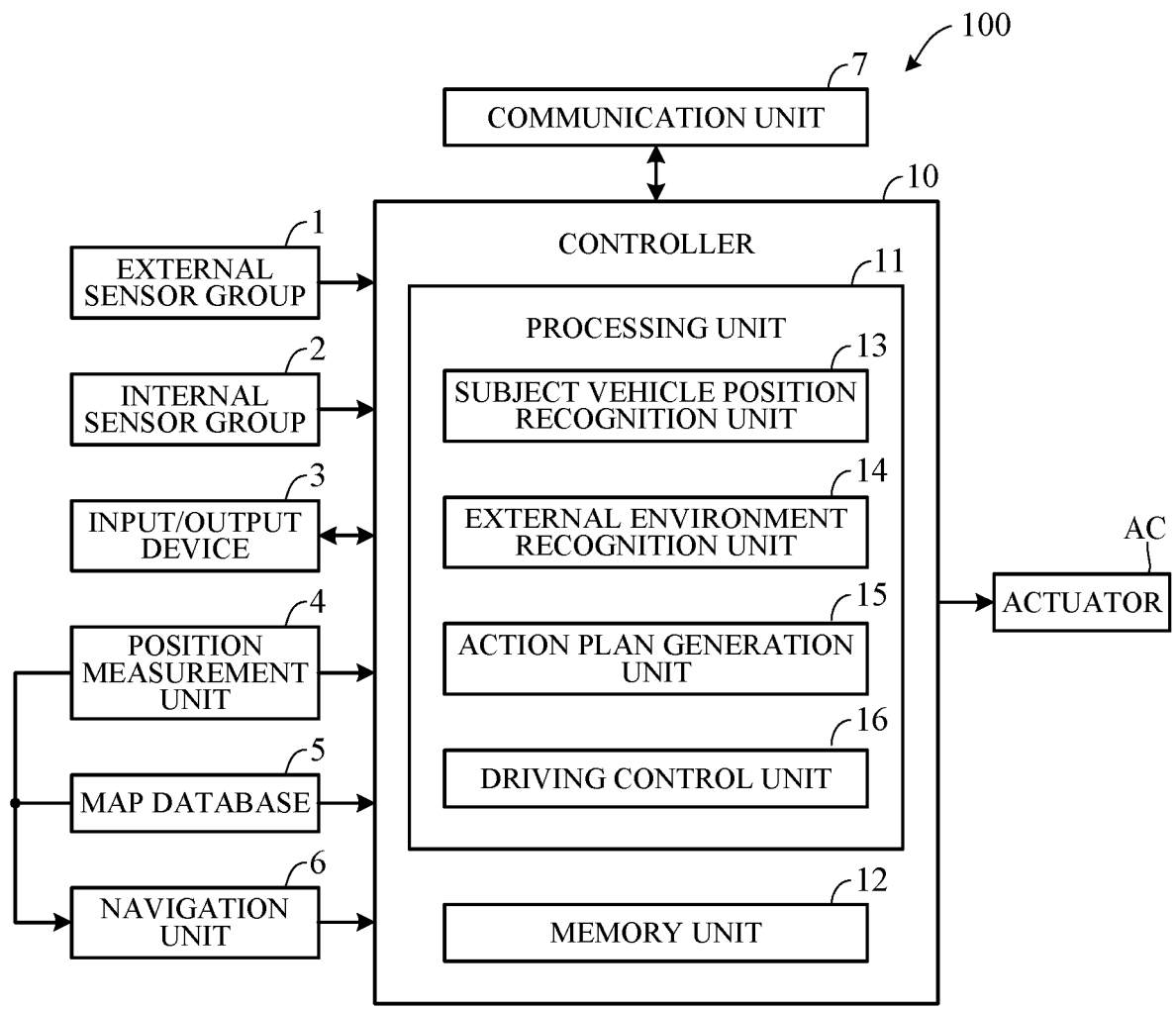
FIG. 1 is a block diagram schematically illustrating an overall configuration of a vehicle control system for a self-driving vehicle having a vehicle control apparatus according to an embodiment of the present invention.

First, the general configuration of the subject vehicle for self-driving will be explained. FIG. 1 is a block diagram schematically illustrating an overall configuration of a vehicle control system 100 of the subject vehicle having the vehicle control apparatus according to an embodiment of the present invention. As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10 via a CAN communication line or the like.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) that detects a position (distance or direction from the subject vehicle) of an object around the subject vehicle by emitting laser light and detecting reflected light, a radar (Radio Detection and Ranging) that detects a position of an object around the subject vehicle by emitting electromagnetic wave and detecting reflected waves, a camera that includes an imaging device such as a CCD or CMOS and captures an image of the surroundings of the subject vehicle, and the like. The LIDAR and radar can detect an object in an imaging area of the camera.

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning measurement sensor can also be included in the internal sensor group 2. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a hard disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 5. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information, traffic data and the like, periodically or at arbitrary times. The networks include not only public wireless communications network, but also closed communications networks, such as wireless LAN, Wi-Fi and Bluetooth, which are established for a predetermined administrative area. Acquired map data are output to the map database 5 and/or memory unit 12 via the controller 10 to update their stored map data.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information). The road map information includes information on road position, information on road shape (curvature, etc.), information on gradient of the road, information on position of intersections and branches, information on the number of lanes, information on width of lane and the position of each lane (center position of lane and boundary line of lane), information on landmarks (traffic lights, signs, buildings, etc.) as a mark on the map, and information on the road surface profile such as unevennesses of the road surface, etc. The information on landmarks (landmark information) includes information such as a shape (outline), characteristic, and position of the landmark. The memory unit 12 also stores information such as programs for various controls, and thresholds used in the programs.

As functional configurations in relation to mainly self-driving, the processing unit 11 includes a subject vehicle position recognition unit 13, an external environment recognition unit 14, an action plan generation unit 15, and a driving control unit 16. The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 7.

The external environment recognition unit 14 recognizes external circumstances around the subject vehicle based on signals from cameras, LIDERs, radars and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road division lines and stop lines, buildings, guardrails, power poles, commercial signs, pedestrians, bicycles, tunnel entrances, and the like. Recognized states of other objects include, for example, traffic light color (red, green or yellow) and moving speed and direction of pedestrians and bicycles.

An object to be detected by the external sensor group 1 is referred to as a target. Targets include both a person and an object and both a moving body and a stationary body. The external environment recognition unit 14 integrally processes detection data obtained from different types of sensors (for example, the camera and radar) included in the external sensor group 1 (fusion processing), determines whether or not the same target is detected by each sensor, and derives position data of the target. For example, when the same target is detected, the position data of the target is derived by performing fusion processing such as coordinate conversion of the detection data, complementation and averaging of the data, etc. Thus, the position of the target can be accurately recognized. The position data includes not only data indicating a position but also data indicating a speed that is a change amount of the position per unit time.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances (targets) recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

In the present embodiment, the position data of the same target is determined based on the detection values of the external sensor group 1 of different types, such as the camera and the radar. However, in a case that there is a road surface with upward gradient in front of the subject vehicle, when the forward vehicle starts traveling on the gradient while the subject vehicle is traveling on a flat surface, the position accuracy of the target by the camera in the forward vehicle as the detection object decreases. That is, since the accuracy of distance measurement of the camera is inferior to that of the radar or the LIDAR, it is difficult to accurately detect the position of the forward vehicle in a situation where the forward vehicle is traveling uphill. Therefore, the present embodiment configures the vehicle control apparatus as follows so that the position of the target can be accurately detected even in a situation where the forward vehicle is traveling on an upward gradient (for example, traveling uphill) rather than the subject vehicle.

Figure 2:
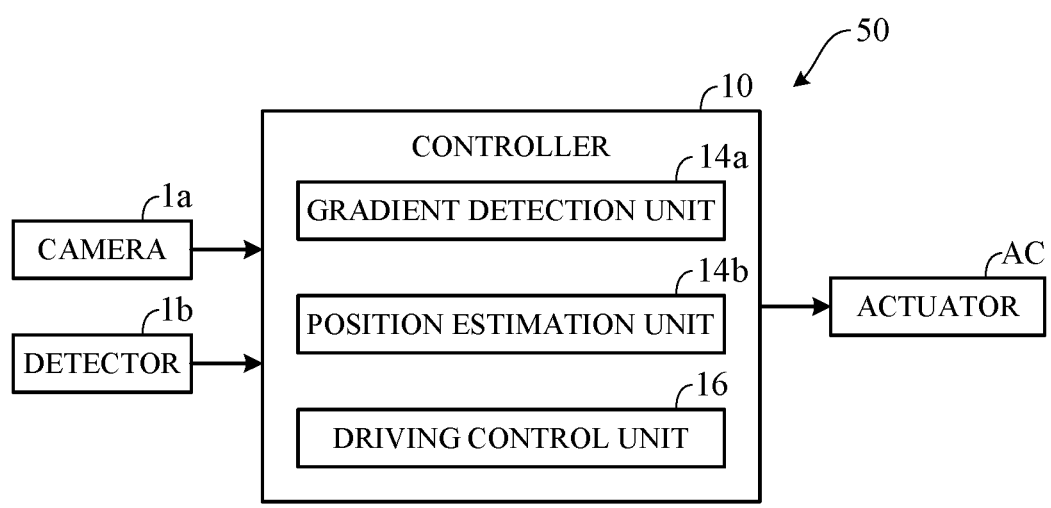
FIG. 2 is a block diagram illustrating a configuration of a substantial part of the vehicle control apparatus according to the embodiment of the invention.

FIG. 2 is a block diagram illustrating a configuration of a substantial part of the vehicle control apparatus 50 according to the embodiment of the present invention. The vehicle control apparatus 50 constitutes a part of the vehicle control system 100 in FIG. 1. As illustrated in FIG. 2, the vehicle control apparatus 50 includes a camera 1a, a detector 1b, the controller 10, and the actuator AC.

The camera 1a is a monocular camera having an imaging element (image sensor) such as a CCD or a CMOS, and constitutes a part of the external sensor group 1 in FIG. 1. The camera 1a may be a stereo camera. The camera 1a is mounted at a predetermined position, for example, in front of the subject vehicle, and continuously captures an image of a space in front of the subject vehicle to acquire an image (camera image) of the target. The target includes a forward vehicle traveling in front of the subject vehicle, a person, a structure, and the like. Based on the camera image, the position and type of the target can be recognized. That is, when a horizontal direction of the two-dimensional camera image is x-direction and a vertical direction is y-direction, the position of the target in a vehicle width direction can be determined by the position in x-direction on the camera image, and the position of the target in a height direction and a traveling direction can be determined by the position in y-direction. That is, the position data (position information) of the target can be acquired by the camera 1a.

The detector 1b includes one or both of a radar and a LIDAR to detect a distance from the subject vehicle to the target based on reflected wave from the detection object. The position data (position information) of the target with respect to the subject vehicle can be acquired by the detector 1b. The position data includes data of position and data of speed of the target. The detection area by the detector 1b is included in the imaging area of the camera 1a. Therefore, when the target detected by the camera 1a and the target detected by the detector 1b are the same, the position and the speed of the target can be derived by performing the sensor fusion processing. Hereinafter, the target detected by the camera 1a is referred to as "a camera target", and the target detected by the detector 1b is referred to as "a radar target".

The controller 10 in FIG. 2 includes a gradient detection unit 14a, a position estimation unit 14b, and a driving control unit 16 as a functional configuration undertaken by the processing unit 11 (FIG. 1). The gradient detection unit 14a and the position estimation unit 14b are provided to recognize an external situation around the subject vehicle, and are configured by, for example, the external environment recognition unit 14 in FIG. 1.

The gradient detection unit 14a determines whether or not the front side of the subject vehicle is in the predetermined gradient state based on the camera image acquired by the camera 1a, and thereby detects the predetermined gradient state of the road surface in front of the subject vehicle. The predetermined gradient state is a state of an upward gradient of a predetermined degree or more with respect to the road surface at the current position of the subject vehicle. Therefore, when the road surface at the current position of the subject vehicle is in an upward gradient, it means a state of an upward slope steeper than that by the predetermined degree or more. The gradient detection unit 14a can detect the predetermined gradient state (determine a presence or absence of the predetermined gradient state) based on the camera image including the forward vehicle.

Figure 3:
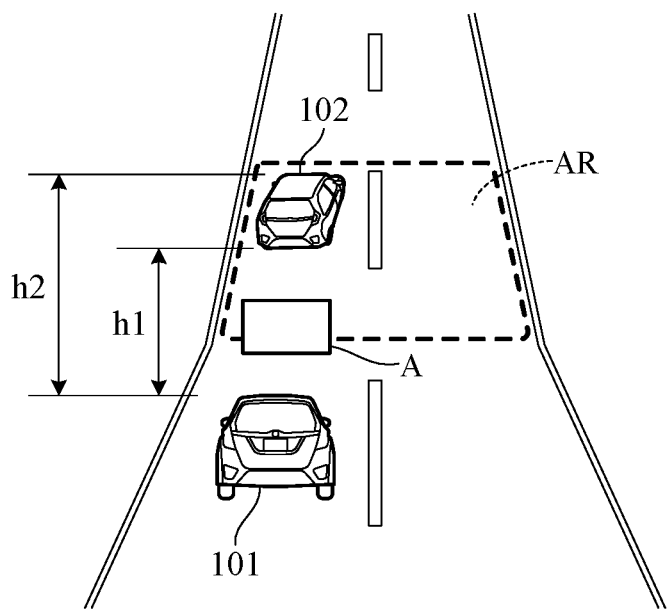
FIG. 3 is a diagram illustrating an example of an operation by the vehicle control apparatus according to the embodiment of the present invention.

FIG. 3 is a diagram illustrating an example of traveling scene of the subject vehicle 101. In FIG. 3, a scene in which the forward vehicle 102 travels uphill ahead of the subject vehicle 101 traveling on a flat surface is schematically illustrated in two dimensions. As shown in FIG. 3, when the forward vehicle 102 is traveling uphill, with a focus on a length (height) in the y-direction from the subject vehicle 101 to the forward vehicle 102 on the two-dimensional camera image, that is, the length from the lower end of the camera image, the length in the y-direction to the rear end of the forward vehicle 102 (lower end in the image) becomes a minimum height h1, and the length in the y-direction to the front end of the forward vehicle 102 (upper end in the image) becomes a maximum height h2.

The larger the degree of the gradient in the uphill, the larger the difference Δh (=h2−h1) between the maximum height h2 and the minimum height h1. In addition, the larger the degree of the gradient in the uphill, the larger a ratio α (=h2/h1) of the maximum height h2 to the minimum height h1. In consideration of this point, the gradient detection unit 14a detects the predetermined gradient state (determines to be in the predetermined gradient state) when the height difference Δh is equal to or greater than a predetermined value or the height ratio α is equal to or greater than a predetermined value. When the forward vehicle 102 is traveling uphill, the minimum height h1 increases. Therefore, as a simpler method, the predetermined gradient state may be detected when the minimum height h1 is equal to or greater than a predetermined value. When the predetermined gradient state is detected, the gradient detection unit 14a assigns a slope flag to the camera target detected within a predetermined range AR centered on the forward vehicle 102. For example, the slope flag is added to the forward vehicle 102 or the target "A" in FIG. 3. In FIG. 3, a part of the target "A" protrudes from the predetermined range AR, but is mostly within the predetermined range AR. The slope flag may be added to the target including the whole within the predetermined range AR.

When the predetermined gradient state is detected by the gradient detection unit 14a, the position estimation unit 14b lowers a reliability of position data in the y direction of the camera target to which the slope flag is added. Instead of always lowering the reliability of the camera target to which the slope flag is added, the reliability of the camera target may be lowered when the difference between the y-direction position of the camera target and the y-direction position of the radar target when the same detection object is captured is equal to or larger than a predetermined value. The y-direction position of the camera target is the position of the target in the traveling direction of the subject vehicle determined from the y-direction position of the camera image. The y-direction position of the radar target is the position of the target corresponding to the y-direction position of the camera image, and the position of the target in the traveling direction of the subject vehicle determined by the detector 1b (distance from the subject vehicle).

When the reliability of the camera target is lowered, the position estimation unit 14b estimates the position of the target for vehicle control (control target) in the y-direction, that is, a relative position to the subject vehicle in the traveling direction of the subject vehicle by using only the radar target without using the camera target. This makes it possible to accurately determine the position of the forward vehicle 102 while traveling on a slope. When the difference between the y-direction position of the camera target and the y-direction position of the radar target is less than the predetermined value, the position estimation unit 14b estimates the position of the target using the camera target and the radar target. With respect to the x-direction position of the target, since the difference between the camera target and the radar target is small even during the uphill travel, the position of the target is estimated using the camera target and the radar target.

On the other hand, in some cases, the radar target corresponding to the camera target to which the slope flag is added cannot be obtained. At this time, the position estimation unit 14b determines whether or not the camera target and the radar target have been linked within a predetermined time in the past, that is, whether or not the camera 1a and the detector 1b have detected the same target. In other words, it is determined whether or not the radar target corresponding to the camera target has been obtained within the predetermined time in the past. In this case, when the fusion process is performed by linking the camera target and the radar target, the information is stored for at least a predetermined time, and thereby it is determined whether or not the camera target and the radar target have been linked within the predetermined time in the past. When it is determined that there is a linkage, the position estimation unit 14b estimates the position of the current target by using the detected value of the radar target in the past. When it is determined that the camera target and the radar target have not been linked within the predetermined time in the past, the position estimation unit 14b sets an unstable flag and estimates the position of the target by using, for example, the camera target. That is, since the detection value of the camera target in the predetermined gradient state has a large error, the unstable flag is set to perform a travel control different from normal.

The driving control unit 16 controls the travel actuator AC based on the position of the target (control target) estimated by the position estimation unit 14b. For example, when the subject vehicle follows the forward vehicle by the constant inter-vehicle distance control in self-driving, the driving control unit 16 calculates the inter-vehicle distance from the subject vehicle to the forward vehicle based on position data of the control target indicating the forward vehicle, and controls the actuator AC so that the inter-vehicle distance becomes a predetermined target inter-vehicle distance. However, when the unstable flag is set, the driving control unit 16 delays the operation timing of the acceleration and the deceleration during the following traveling from that when the unstable flag is not set. In other words, the driving control unit 16 softens the acceleration operation and the deceleration operation of the subject vehicle. On the other hand, when the automatic braking for sudden stop of the subject vehicle is activated, the driving control unit 16 makes the activation timing of the automatic braking when the unstable flag is set earlier than that when the unstable flag is not set, in consideration of safety.

Figure 4:
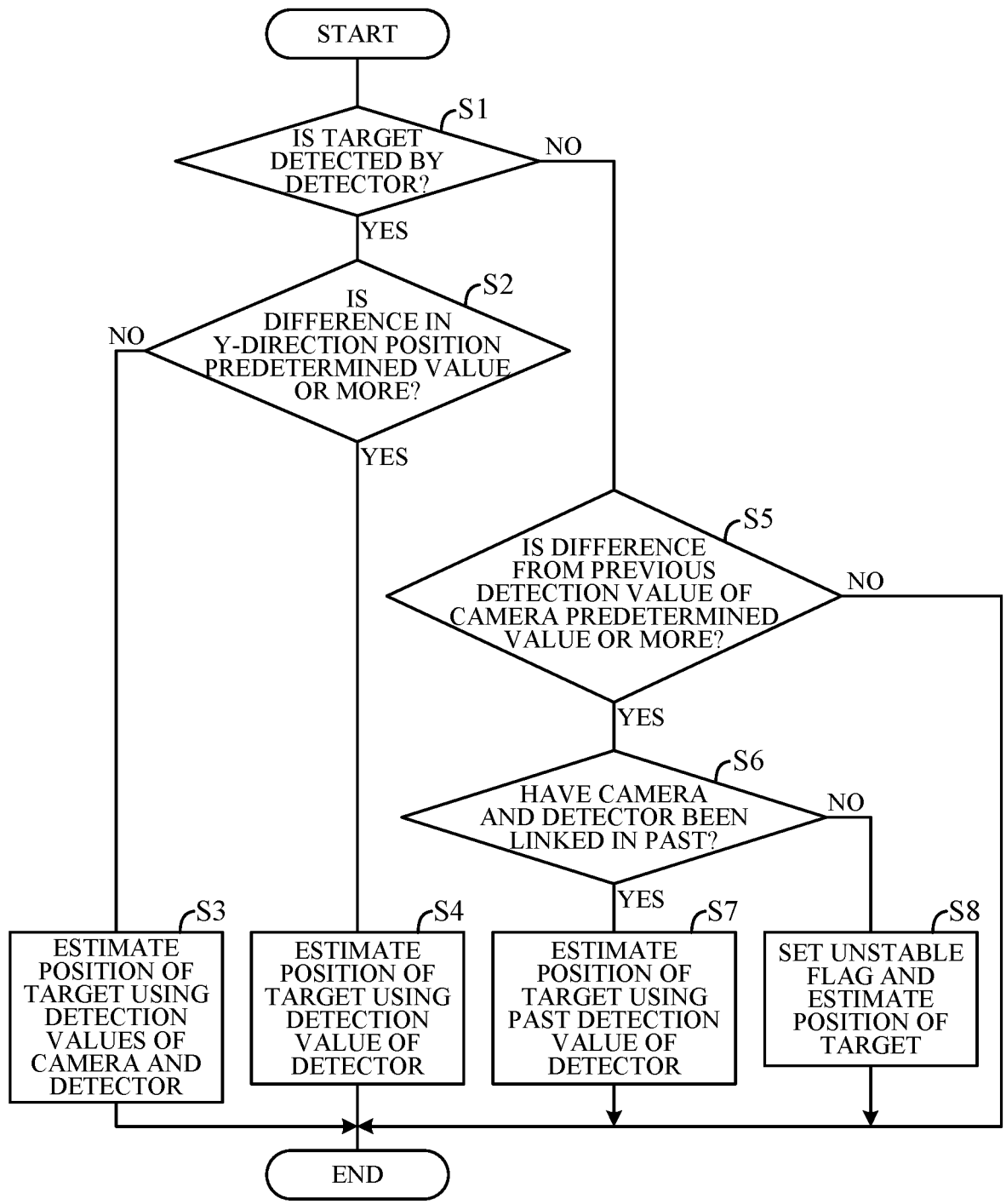
FIG. 4 is a flowchart illustrating an example of processing executed by a controller in FIG. 2.

FIG. 4 is a flowchart illustrating an example of processing executed by the controller 10 in FIG. 2 according to a predetermined program, particularly an example of processing in the position estimation unit 14b. The processing illustrated in this flowchart is started, for example, when the predetermined gradient state is detected by the gradient detection unit 14a and the slope flag is added to the camera target. Then, as long as this state continues, it is repeated at a predetermined cycle corresponding to the operation cycle of the computer. The controller 10 acquires position information obtained by the camera target and position information obtained by the radar target at each predetermined cycle.

As illustrated in FIG. 4, first, in S1 (S: processing step), the controller 10 determines whether or not a radar target corresponding to the camera target to which the slope flag is added is detected by the detector 1b. That is, it determines whether or not the target detected by the camera 1a is also detected by the detector 1b. If an affirmative determination is made in S1, the process proceeds to S2, in which the controller 10 determines whether or not the difference between the y-direction position of the camera target and the y-direction position of the radar target is equal to or greater than a predetermined value. This determination is made as to whether or not the position based on the camera target and the position based on the radar target deviate from each other by a predetermined degree or more due to the detection of the predetermined gradient state. If a negative determination is made in S2, the process proceeds to S3, and if an affirmative determination is made, the process proceeds to S4.

In S3, the controller 10 estimates the position of the target using the detection values of the camera 1a and the detector 1b. That is, the position of the target is estimated by performing fusion processing of the camera target and the radar target. On the other hand, in S4, the reliability of the camera target is lowered. For example, the reliability is set to 0. Then, the controller 10 estimates the position of the target by the radar target detected by the detector 1b. That is, the position of the target in the vehicle traveling direction is estimated using only the detection value of the detector 1b without using the detection value of the camera 1a.

When the radar target corresponding to the camera target to which the slope flag is added is not detected by the detector 1b and thus a negative determination is made in S1, the process proceeds to S5. In S5, the controller 10 determines whether or not the difference between the y-direction position of the camera target detected in the previous processing (before the predetermined cycle) by the camera 1a and the y-direction position of the camera target detected in the current processing is equal to or greater than a predetermined value. If an affirmative determination is made in S5, the process proceeds to S6, and if a negative determination is made, the process ends. In S6, the controller 10 determines whether or not fusion processing between the radar target detected in the past (for example, detected in the previous processing) by the detector 1b and the camera target has been performed, that is, whether or not the camera 1a and the detector 1b have been linked in the past. If an affirmative determination is made in S6, the process proceeds to S7, and if a negative determination is made, the process proceeds to S8.

In S7, the controller 10 estimates the position of the target using the past detection value of the detector 1b. In estimating the position of the target, for example, the detection value of the internal sensor group 2 (vehicle speed sensor, yaw rate sensor, or the like) is referred to. On the other hand, in S8, the controller 10 sets an unstable flag and estimates the position of the target based on the camera target. In a state where the unstable flag is set, the driving control unit 16 controls the actuator AC in a manner different from that when the unstable flag is not set. For example, it controls the actuator AC so as to delay the operation timing of the acceleration/deceleration when the vehicle speed constant control is performed, or when the inter-vehicle distance control for controlling the inter-vehicle distance from the subject vehicle 101 to the forward vehicle 102 to a predetermined value is performed. Or, the driving control unit 16 controls the actuator AC so as to advance the activation of the automatic braking.

The operation of the vehicle control apparatus 50 according to the present embodiment is summarized as follows. When the subject vehicle 101 is following the forward vehicle 102 by the inter-vehicle distance control, if the subject vehicle 101 and the forward vehicle 102 are traveling on the road surface having the same gradient, the predetermined gradient state is not detected. In this case, the position of the target is estimated by the fusion process using the camera target detected by the camera 1a and the radar target detected by the detector 1b, and the actuator AC is controlled.

On the other hand, as shown in FIG. 3, when the predetermined gradient state is detected in front of the subject vehicle 101, and thus the slope flag is added to the camera target and the difference between the camera target and the radar target becomes equal to or larger than the predetermined value, the position of the target is estimated using the radar target without using the camera target (S4). Thus, in a situation where the forward vehicle 102 is traveling uphill, the position of the target can be accurately estimated using the detection value of the detector 1b. The target in this case is the forward vehicle 102. As a result, the following traveling and the like can be performed satisfactorily.

When the target detected by the camera 1a is not detected by the detector 1b, if the difference from the previous detection value of the camera target is equal to or greater than the predetermined value and the camera 1a and the detector 1b are linked within the predetermined time in the past (for example, in the previous processing), the position of the target is estimated using the past detection value of the detector 1b (S7). Accordingly, even if the target is not detected at the present time by the detector 1b, the position of the target can be accurately estimated without using the camera target whose reliability is lowered. On the other hand, if the camera 1a and the detector 1b are not linked within the predetermined time in the past, the position of the target is estimated using the camera target after setting the unstable flag (S8). When the unstable flag is set, the actuator AC is controlled in a different manner than usual. This makes it possible to appropriately control the traveling operation of the subject vehicle 101 based on the position of the target.

The present embodiment can achieve advantages and effects such as the following:

(1) The vehicle control apparatus 50 includes a camera 1a that captures an image of an external environment around the subject vehicle 101 to acquire position information of a target, a detector 1b that acquires position information of the target based on a reflected wave from a detection object in an imaging area of the camera 1a, a position estimation unit 14b that estimates a position of the target based on the position information acquired by the camera 1a and the position information acquired by the detector 1b, a driving control unit (actuator control unit) 16 that controls a travel actuator AC mounted on the subject vehicle 101 based on the position of the target estimated by the position estimation unit 14b, and a gradient detection unit 14a that detects a predetermined gradient state in which a gradient of a road surface in front of the subject vehicle 101 is an upward gradient of a predetermined degree or more with respect to a road surface at a current position of the subject vehicle 101 (FIGS. 2 and 3). When the predetermined gradient state is detected by the gradient detection unit 14a, the position estimation unit 14b estimates the position of the target by lowering the reliability of the position information along the traveling direction of the subject vehicle 101 acquired by the camera 1a (for example, by setting the reliability to 0) among the position information of the target (the target to which the slope flag is added) captured on the road surface in the predetermined gradient state. This makes it possible to accurately estimate the position of the target in the predetermined gradient state.

(2) The position estimation unit 14b determines a difference between the position information along the traveling direction of the subject vehicle 101 acquired by the camera 1a and the position information along the traveling direction of the subject vehicle 101 acquired by the detector 1b among the position information of the target captured on the road surface in the predetermined gradient state, and estimates the position of the target based on the position information along the traveling direction of the subject vehicle 101 acquired by the detector 1b without using the position information along the traveling direction of the subject vehicle 101 acquired by the camera 1a when the difference is equal to or greater than a predetermined value (S4). That is, in this case, since it is considered that the error of the detection value by the camera 1a is large, the camera target is not used. This makes it possible to accurately estimate the position of the target even when the vehicle front side is on an uphill slope.

(3) The detector 1b is configured to acquire position information of the target at a predetermined time interval. When the position information of the target (camera target) on the road surface in the predetermined gradient state is acquired at the present time by the camera 1a, and the position information of the target (radar target) on the road surface in the predetermined gradient state is not acquired at the present time by the detector 1b, the position estimation unit 14b estimates the position of the target along the traveling direction of the subject vehicle 101 based on the position information of the target corresponding to the target captured by the camera 1a, acquired by the detector 1b within the predetermined time in the past (S7). Accordingly, even when the radar target is not detected at the present time, the position of the target can be accurately estimated.

(4) In a state in which the predetermined gradient state is detected by the gradient detection unit 14a, when the detector 1b does not acquire the target of the same detection object as the target acquired by the camera 1a, the position estimation unit 14b sets an unstable flag and estimates the position of the target based on the position information along the traveling direction of the subject vehicle 101 acquired by the camera 1a (S8). At this time, the driving control unit 16 controls the actuator AC so that the acceleration/deceleration of the subject vehicle 101 when the unstable flag is set by the position estimation unit 14b is different from the acceleration/deceleration of the subject vehicle 101 when the unstable flag is not set. Accordingly, the actuator AC can be controlled satisfactorily even in a state where the radar target is not detected. It also contributes to improving traffic safety.

(5) For example, in the case of performing inter-vehicle distance control for controlling the inter-vehicle distance from the subject vehicle 101 to the forward vehicle 102 to a predetermined value, the driving control unit 16 controls the actuator AC so as to delay the operation timing of the acceleration/deceleration as compared with the case where the unstable flag is not set when the unstable flag is set by the position estimation unit 14b. Accordingly, even in a state in which the unstable flag is set, the subject vehicle can follow the forward vehicle while controlling the inter-vehicle distance satisfactorily.

(6) The actuator AC for travelling includes a braking actuator for braking the subject vehicle 101. In a case that the automatic braking is activated in an emergency, the driving control unit 16 controls the actuator (braking actuator) AC so that an activation timing of the automatic braking when the unstable flag is set by the position estimation unit 14b is earlier than the activation timing of the automatic braking when the unstable flag is not set. This makes it possible to operate the automatic braking satisfactorily even in a condition where the unstable flag is set.

The above embodiment may be modified into various forms. Hereinafter, some modifications will be described. In the above embodiment, the difference between the position information (a first position information) of the vehicle traveling direction by the camera target and the position information (a second position information) of the vehicle traveling direction by the radar target among the position information of the target captured on the road surface in the predetermined gradient state is determined, and when the difference is equal to or larger than a predetermined value, the position of the target is estimated based on the position information by the radar target without using the position information by the camera target. However, as long as the reliability of the position information by the camera target is lowered to estimate the position of the target, the position of the target may be estimated using the camera target. Therefore, the configuration of a position estimation unit is not limited to the configuration described above. The position information may include not only information on position of the target but also information on speed of the target.

Although in the above embodiment, the predetermined gradient state is detected based on the length (height) h1,h2 of the forward vehicle 102 in the y-direction on the camera images, the predetermined gradient state may be detected based on, for example, a reflected wave from the road surface of a radar or a LIDAR. Gradients may be detected using map information. Therefore, the configuration of a gradient detection unit is not limited to the configuration described above. The gradient detection unit determines whether or not the road surface in front of the subject vehicle is in a predetermined gradient state. Therefore, the gradient detection unit may be used as a gradient determination unit. In the above embodiment, the radar or the LIDAR is used as the detector 1b. However, any configuration of a detector (a position detecting part) may be used as long as it is configured to acquire position information of the target based on reflected wave from the detection object in an imaging area of the camera.

In the above embodiment, examples of the inter-vehicle distance control and the automatic braking control are described as an example of travel control by the driving control unit 16 when the unstable flag is set. However, an actuator control unit may perform other control such that the acceleration/deceleration of the subject vehicle when the unstable flag is set (in a flag-on state) and the acceleration/deceleration of the subject vehicle when the unstable flag is not set (in a flag-off state) are different. In the above embodiment, the vehicle control apparatus 50 is applied to a traveling scene in which the forward vehicle 102 is traveling, but the vehicle control apparatus 50 can be applied even if the forward vehicle 102 is not traveling.

Although in the above embodiment, an example in which the vehicle control apparatus 50 is applied to the self-driving vehicle is described, the present invention can be similarly applied to a manual driving vehicle having or not having a driving support function.

The present invention can also be used as a vehicle control method including acquiring a first position information of a target by capturing an image of an external environment around a subject vehicle by a camera, acquiring a second position information of the target by a detector based on a reflected wave from a detection object in an imaging area of the camera, estimating a position of the target, based on the first position information acquired by the camera and the second position information acquired by the detector, controlling an actuator for traveling mounted on the subject vehicle, based on the position of the target estimated in the estimating, and detecting a predetermined gradient state in which a gradient of a road surface in front of the subject vehicle is an upward gradient of a predetermined degree or more with respect to a road surface at a current position of the subject vehicle, wherein the estimating includes estimating the position of the target by lowering a reliability of the first position information along a traveling direction of the subject vehicle acquired by the camera among a position information including the first position information and the second position information of the target captured on the road surface in the predetermined gradient state when the predetermined gradient state is detected.

The above embodiment can be combined as desired with one or more of the above modifications. The modifications can also be combined with one another.

According to the present invention, it is possible to accurately recognize a target even when a road surface in front of a subject vehicle is inclined at an upward slope compared to a road face on which the subject vehicle is present.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus, comprising:
   a camera that captures an image of an external environment around a subject vehicle to acquire first position information of a target;
   a detector that acquires second position information of the target based on a reflected wave from a detection object in an imaging area of the camera; and
   an electronic control unit including a microprocessor and a memory connected to the microprocessor, wherein
   the microprocessor is configured to perform:
      estimating a position of the target, based on the first position information acquired by the camera and the second position information acquired by the detector;
      controlling an actuator for traveling mounted on the subject vehicle, based on the position of the target estimated; and
      detecting a predetermined gradient state in which a gradient of a road surface in front of the subject vehicle is an upward gradient of a predetermined degree or more with respect to a road surface at a current position of the subject vehicle, and
   the microprocessor is configured to perform
   the estimating including estimating the position of the target by lowering a reliability of the first position information along a traveling direction of the subject vehicle acquired by the camera among position information including the first position information and the second position information of the target captured on the road surface in the predetermined gradient state when the predetermined gradient state is detected.

2. The vehicle control apparatus according to claim 1, wherein
   the microprocessor is configured to perform
   the estimating including determining a difference between the first position information along the traveling direction of the subject vehicle acquired by the camera and the second position information along the traveling direction of the subject vehicle acquired by the detector, among the position information of the target captured on the road surface in the predetermined gradient state, and estimating the position of the target based on the second position information along the traveling direction of the subject vehicle acquired by the detector without using the first position information along the traveling direction of the subject vehicle acquired by the camera when the difference is equal to or greater than a predetermined value.

3. The vehicle control apparatus according to claim 1, wherein
   the detector is configured to acquire the second position information of the target at an interval of a predetermined time, and
   the microprocessor is configured to perform
   the estimating including estimating the position of the target along the traveling direction of the subject vehicle based on the second position information of the target corresponding to the target captured by the camera, acquired by the detector at a past time, in a predetermined situation where the first position information of the target on the road surface in the predetermined gradient state is acquired by the camera at a present time while the second position information of the target on the road surface in the predetermined gradient state is not acquired by the detector at the present time.

4. The vehicle control apparatus according to claim 3, wherein
   the microprocessor is configured to perform
   the estimating including setting an unstable flag and estimating the position of the target based on the first position information along the traveling direction of the subject vehicle acquired by the camera, when the predetermined gradient state is detected and the target captured by the camera is not captured by the detector, and
   the controlling including controlling the actuator so that an acceleration and deceleration of the subject vehicle in a flag-on state where the unstable flag is set and an acceleration and deceleration of the subject vehicle in a flag-off state where the unstable flag is not set differ from each other.

5. The vehicle control apparatus according to claim 4, wherein
   the microprocessor is configured to perform
   the controlling including controlling the actuator so as to perform an inter-vehicle distance control controlling an inter-vehicle distance from the subject vehicle to a forward vehicle in front of the subject vehicle to a predetermined value, and so as to delay a timing of the acceleration and deceleration in the flag-on state from a timing of the acceleration and deceleration in the flag-off state during the inter-vehicle distance control.

6. The vehicle control apparatus according to claim 4, wherein
   the actuator includes a braking actuator braking the subject vehicle, and
   the microprocessor is configured to perform
   the controlling including controlling the braking actuator so as to perform an automatic braking, and
   the controlling further including controlling the braking actuator so that an activation timing of the automatic braking in the flag-on state is earlier than an activation timing of the automatic braking in the flag-off state.

7. The vehicle control apparatus according to claim 3, wherein
the microprocessor is configured to perform
the estimating including estimating the position of the target along the traveling direction of the subject vehicle in the predetermined situation, based on the second position information of the target corresponding to the target captured by the camera, acquired by the detector before the predetermined time.

8. The vehicle control apparatus according to claim 3, wherein
the microprocessor is configured to perform
the estimating including estimating the position of the target along the traveling direction of the subject vehicle in the predetermined situation, based on the second position information of the target corresponding to the target captured by the camera, acquired by the detector at the past time, when a difference between the first position information of the target on the road surface in the predetermined gradient state acquired by the camera at the present time and the first position information of the target on the road surface in the predetermined gradient state acquired by the camera before the predetermined time is equal to or greater than a predetermined value.

9. The vehicle control apparatus according to claim 1, wherein
the microprocessor is configured to perform
the detecting including detecting the predetermined gradient state in a case that a forward vehicle traveling in front of the subject vehicle is imaged by the camera, when a length in a height direction from a lower end to an upper end on a vehicle image corresponding to the forward vehicle among a camera image captured by the camera is equal to or greater than a predetermined value or when a ratio of a length in the height direction from a lower end on the camera image to the upper end on the vehicle image to a length in the height direction from the lower end on the camera image to the lower end on the vehicle image.

10. A vehicle control apparatus, comprising:
a camera that captures an image of an external environment around a subject vehicle to acquire first position information of a target;
a detector that acquires second position information of the target based on a reflected wave from a detection object in an imaging area of the camera; and
an electronic control unit including a microprocessor and a memory connected to the microprocessor, wherein
the microprocessor is configured to function as:
 a position estimation unit that estimates a position of the target, based on the first position information acquired by the camera and the second position information acquired by the detector;
 an actuator control unit that controls an actuator for traveling mounted on the subject vehicle, based on the position of the target estimated by the position estimation unit; and
 a gradient detection unit that detects a predetermined gradient state in which a gradient of a road surface in front of the subject vehicle is an upward gradient of a predetermined degree or more with respect to a road surface at a current position of the subject vehicle, and
the position estimation unit estimates the position of the target by lowering a reliability of the first position information along a traveling direction of the subject vehicle acquired by the camera among position information including the first position information and the second position information of the target captured on the road surface in the predetermined gradient state when the predetermined gradient state is detected by the gradient detection unit.

11. The vehicle control apparatus according to claim 10, wherein
the position estimation unit determines a difference between the first position information along the traveling direction of the subject vehicle acquired by the camera and the second position information along the traveling direction of the subject vehicle acquired by the detector, among the position information of the target captured on the road surface in the predetermined gradient state, and estimates the position of the target based on the second position information along the traveling direction of the subject vehicle acquired by the detector without using the first position information along the traveling direction of the subject vehicle acquired by the camera when the difference is equal to or greater than a predetermined value.

12. The vehicle control apparatus according to claim 10, wherein
the detector is configured to acquire the second position information of the target at an interval of a predetermined time, and
the position estimation unit estimates the position of the target along the traveling direction of the subject vehicle based on the second position information of the target corresponding to the target captured by the camera, acquired by the detector at a past time, in a predetermined situation where the first position information of the target on the road surface in the predetermined gradient state is acquired by the camera at a present time while the second position information of the target on the road surface in the predetermined gradient state is not acquired by the detector at the present time.

13. The vehicle control apparatus according to claim 12, wherein
the position estimation unit sets an unstable flag and estimates the position of the target based on the first position information along the traveling direction of the subject vehicle acquired by the camera, when the predetermined gradient state is detected by the gradient detection unit and the target captured by the camera is not captured by the detector, and
the actuator control unit controls the actuator so that an acceleration and deceleration of the subject vehicle in a flag-on state where the unstable flag is set by the position estimation unit and an acceleration and deceleration of the subject vehicle in a flag-off state where the unstable flag is not set differ from each other.

14. The vehicle control apparatus according to claim 13, wherein
the actuator control unit controls the actuator so as to perform an inter-vehicle distance control controlling an inter-vehicle distance from the subject vehicle to a forward vehicle in front of the subject vehicle to a predetermined value, and so as to delay a timing of the acceleration and deceleration in the flag-on state from a timing of the acceleration and deceleration in the flag-off state during the inter-vehicle distance control.

15. The vehicle control apparatus according to claim 13, wherein the actuator includes a braking actuator braking the subject vehicle, the actuator control unit controls the braking actuator so as to perform an automatic braking, and the actuator control unit further controls the braking actuator so that an activation timing of the automatic braking in the flag-on state is earlier than an activation timing of the automatic braking in the flag-off state.

16. The vehicle control apparatus according to claim 12, wherein the position estimation unit estimates the position of the target along the traveling direction of the subject vehicle in the predetermined situation, based on the second position information of the target corresponding to the target captured by the camera, acquired by the detector before the predetermined time.

17. The vehicle control apparatus according to claim 12, wherein the position estimation unit estimates the position of the target along the traveling direction of the subject vehicle in the predetermined situation, based on the second position information of the target corresponding to the target captured by the camera, acquired by the detector at the past time, when a difference between the first position information of the target on the road surface in the predetermined gradient state acquired by the camera at the present time and the first position information of the target on the road surface in the predetermined gradient state acquired by the camera before the predetermined time is equal to or greater than a predetermined value.

18. The vehicle control apparatus according to claim 10, wherein the gradient detection unit detects the predetermined gradient state in a case that a forward vehicle traveling in front of the subject vehicle is imaged by the camera, when a length in a height direction from a lower end to an upper end on a vehicle image corresponding to the forward vehicle among a camera image captured by the camera is equal to or greater than a predetermined value or when a ratio of a length in the height direction from a lower end on the camera image to the upper end on the vehicle image to a length in the height direction from the lower end on the camera image to the lower end on the vehicle image.

19. A vehicle control method, comprising:

acquiring first position information of a target by capturing an image of an external environment around a subject vehicle by a camera;

acquiring second position information of the target by a detector based on a reflected wave from a detection object in an imaging area of the camera;

estimating a position of the target, based on the first position information acquired by the camera and the second position information acquired by the detector;

controlling an actuator for traveling mounted on the subject vehicle, based on the position of the target estimated; and detecting a predetermined gradient state in which a gradient of a road surface in front of the subject vehicle is an upward gradient of a predetermined degree or more with respect to a road surface at a current position of the subject vehicle, wherein the estimating includes estimating the position of the target by lowering a reliability of the first position information along a traveling direction of the subject vehicle acquired by the camera among position information including the first position information and the second position information of the target captured on the road surface in the predetermined gradient state when the predetermined gradient state is detected.

* * * * *